(12) United States Patent
Park

(10) Patent No.: US 12,523,852 B2
(45) Date of Patent: Jan. 13, 2026

(54) OPTICAL IMAGING SYSTEM

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 18/655,951

(22) Filed: May 6, 2024

(65) Prior Publication Data
US 2024/0288669 A1   Aug. 29, 2024

Related U.S. Application Data

(63) Continuation of application No. 17/124,593, filed on Dec. 17, 2020, now Pat. No. 12,007,534, which is a
(Continued)

(30) Foreign Application Priority Data

Nov. 26, 2015   (KR) .................. 10-2015-0166750

(51) Int. Cl.
*G02B 13/00* (2006.01)
*G02B 5/00* (2006.01)
*G02B 9/62* (2006.01)

(52) U.S. Cl.
CPC ......... *G02B 13/0045* (2013.01); *G02B 5/005* (2013.01); *G02B 9/62* (2013.01)

(58) Field of Classification Search
CPC .... G02B 5/005; G02B 13/18; G02B 13/0045; G02B 9/62; G02B 9/64; G02B 27/0025; G02B 15/146; H04N 5/222; H04N 5/2254
(Continued)

(56) References Cited

U.S. PATENT DOCUMENTS 9,201,216 B2   12/2015   Huang et al.
2007/0223106 A1*   9/2007   Kamo ............ G02B 15/144113
359/687

(Continued)

FOREIGN PATENT DOCUMENTS

CN   103529538 A   1/2014
CN   103713380 A   4/2014
(Continued)

OTHER PUBLICATIONS

Korean Office Action issued on May 12, 2017, in counterpart Korean Application No. 10-2015-0166750 (9 pages in English, 7 pages in Korean).

(Continued)

*Primary Examiner* — Travis S Fissel
(74) *Attorney, Agent, or Firm* — NSIP Law

(57) ABSTRACT

An optical imaging system includes a first lens having a negative refractive power, a convex object-side surface, and a concave image-side surface; a second lens having a positive refractive power; a third lens having a negative refractive power; a fourth lens having a positive refractive power; a fifth lens having a negative refractive power; and a sixth lens having a positive refractive power and an image-side surface having an inflection point. The first to sixth lenses are sequentially disposed in ascending numerical order from an object side of the optical imaging system toward an imaging plane of the optical imaging system.

14 Claims, 21 Drawing Sheets

Related U.S. Application Data continuation of application No. 15/084,696, filed on Mar. 30, 2016, now Pat. No. 10,901,182.

(58) Field of Classification Search
USPC .......... 359/656–658, 708, 713, 749, 756–762
See application file for complete search history.

(56) References Cited

U.S. PATENT DOCUMENTS

| | | | |
|---|---|---|---|
| 2009/0059395 | A1 | 3/2009 | Lin et al. |
| 2010/0033834 | A1* | 2/2010 | Matsusaka ............ G02B 15/177 359/682 |
| 2011/0102660 | A1* | 5/2011 | Mihara .......... G02B 15/1445 348/E5.025 |
| 2012/0075721 | A1* | 3/2012 | Konishi ................. G02B 13/18 359/708 |
| 2012/0206822 | A1* | 8/2012 | Hsieh .................... G02B 13/06 359/753 |
| 2014/0009844 | A1 | 1/2014 | Tsai et al. |
| 2014/0092491 | A1 | 4/2014 | Hsu et al. |
| 2014/0240851 | A1* | 8/2014 | Kawamura .............. G02B 9/64 359/708 |
| 2015/0022905 | A1 | 1/2015 | Shinohara et al. |
| 2015/0116843 | A1 | 4/2015 | Jo |
| 2015/0124332 | A1 | 5/2015 | Noda et al. |
| 2015/0124333 | A1 | 5/2015 | Noda et al. |
| 2015/0205071 | A1 | 7/2015 | Hashimoto |
| 2015/0212296 | A1* | 7/2015 | Huang ............... G02B 13/0045 359/713 |
| 2015/0241659 | A1 | 8/2015 | Huang |
| 2015/0241665 | A1 | 8/2015 | Hashimoto |
| 2016/0054543 | A1 | 2/2016 | Nabeta |
| 2016/0062083 | A1 | 3/2016 | Hsueh et al. |
| 2016/0103299 | A1 | 4/2016 | Lin et al. |
| 2016/0109688 | A1 | 4/2016 | Jo |
| 2016/0124188 | A1 | 5/2016 | Chen et al. |
| 2016/0139372 | A1 | 5/2016 | Tanaka |
| 2016/0259150 | A1 | 9/2016 | Shin et al. |
| 2016/0299319 | A1 | 10/2016 | Tang et al. |
| 2017/0003482 | A1 | 1/2017 | Chen |
| 2017/0123187 | A1 | 5/2017 | Heu et al. |

FOREIGN PATENT DOCUMENTS

| | | |
|---|---|---|
| CN | 203981955 U | 12/2014 |
| CN | 204188871 U | 3/2015 |
| CN | 204422848 U | 6/2015 |
| CN | 104808316 A | 7/2015 |
| JP | 2013-7853 A | 1/2013 |
| JP | 2014-44250 A | 3/2014 |
| JP | 2015-79175 A | 4/2015 |
| JP | 2015-165338 A | 9/2015 |
| JP | 2016-95460 A | 5/2016 |
| KR | 10-2016-0108080 A | 9/2016 |
| KR | 10-2017-0051080 A | 5/2017 |
| TW | 201525518 A | 7/2015 |

OTHER PUBLICATIONS

Taiwanese Office Action issued on Sep. 4, 2017, in counterpart Taiwanese Application No. 105110708 (4 pages in English, 4 pages in Chinese).

Korean Office Action issued on Oct. 16, 2017, in counterpart Korean Application No. 10-2015-0166750 (3 pages in English, 3 pages in Korean).

Chinese Office Action issued on Aug. 24, 2018, in counterpart Chinese Application No. 201610269038.8 (6 pages in English, 5 pages in Chinese).

Chinese Office Action issued on Dec. 3, 2020, in counterpart Chinese Patent Application No. 201910520607.5 (5 pages in English, 6 pages in Chinese).

Korean Notice of Reason for Rejection issued on Oct. 8, 2021, in counterpart Korean Patent Application No. 10-2021-0110039 (6 pages in English, 4 pages in Korean).

Korean Office Action issued on Jul. 27, 2022, in counterpart Korean Patent Application No. 10-2022-0083560 (5 pages in English, 4 pages in Korean).

Korean Office Action issued on Jan. 25, 2023, in counterpart Korean Patent Application No. 10-2022-0083560 (5 pages in English, 4 pages in Korean).

U.S. Appl. No. 15/084,696, filed Mar. 30, 2016, Il Yong Park, Samsung Electro-Mechanics Co., Ltd.

U.S. Appl. No. 17/124,593, filed Dec. 17, 2020, Il Yong Park, Samsung Electro-Mechanics Co., Ltd.

* cited by examiner

| FIRST EMBODIMENT ||||||
|---|---|---|---|---|---|
| TTL = 5.203 | FOV = 75.522 | | f = 4.3923 | | |
| SURFACE NO. | RADIUS OF CURVATURE | THICKNESS/ DISTANCE | REFRACTIVE INDEX | ABBE NUMBER | FOCAL LENGTH |
| S1 | 2.0009 | 0.3372 | 1.546 | 56.1 | -602.237 |
| FIRST LENS | | | | | |
| S2 | 1.8703 | 0.0468 | | | |
| S3 | 1.6530 | 0.5856 | 1.546 | 56.1 | 2.816 |
| SECOND LENS | | | | | |
| S4 | -19.4985 | 0.0000 | | | |
| S5 STOP | Infinity | 0.0300 | | | |
| S6 | 6.2664 | 0.2453 | 1.657 | 21.5 | -5.941 |
| THIRD LENS | | | | | |
| S7 | 2.3686 | 0.5667 | | | |
| S8 | -62.8484 | 0.3759 | 1.657 | 21.5 | 49.398 |
| FOURTH LENS | | | | | |
| S9 | -21.4616 | 0.5182 | | | |
| S10 | 8.0411 | 0.5630 | 1.657 | 21.5 | -12.107 |
| FIFTH LENS | | | | | |
| S11 | 3.8889 | 0.1000 | | | |
| S12 | 2.0425 | 0.8626 | 1.537 | 55.7 | 6037.024 |
| SIXTH LENS | | | | | |
| S13 | 1.7422 | 0.1887 | | | |
| S14 | Infinity | 0.2100 | 1.519 | 64.2 | |
| FILTER | | | | | |
| S15 | Infinity | 0.5734 | | | |
| S16 IMAGING PLANE | Infinity | 0.0000 | | | |

FIG. 3

| FIRST EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.18603 | -3.58487 | -1.39911 | 0.00000 | 36.07629 | -9.49821 | 0.00000 | 0.00000 | 10.53890 | -0.48953 | -3.28870 | -2.889178 |
| A | -0.01921 | -0.10569 | -0.09577 | -0.04589 | -0.10495 | 0.04733 | -0.06185 | -0.05313 | 0.05005 | -0.06402 | -0.27010 | -0.142769 |
| B | -0.00348 | 0.00839 | 0.06615 | 0.14448 | 0.25640 | 0.05323 | -0.07686 | -0.11026 | -0.16178 | 0.01216 | 0.14800 | 0.065960 |
| C | -0.02152 | -0.05285 | -0.26622 | -0.48240 | -0.67664 | -0.03661 | 0.21231 | 0.22436 | 0.12900 | -0.00480 | -0.04656 | -0.021260 |
| D | 0.02757 | 0.35649 | 0.84599 | 1.06020 | 1.46438 | 0.05413 | -0.27145 | -0.22311 | -0.06862 | 0.00147 | 0.00907 | 0.004396 |
| E | -0.01493 | -0.47534 | -1.07826 | -1.34442 | -2.03795 | -0.10865 | 0.18375 | 0.12858 | 0.01978 | -0.00039 | -0.00106 | -0.000543 |
| F | 0.00512 | 0.27494 | 0.66025 | 0.91286 | 1.53373 | 0.12135 | -0.05023 | -0.03475 | -0.00221 | 0.00008 | 0.00007 | 0.000036 |
| G | -0.00144 | -0.06419 | -0.16466 | -0.25790 | -0.48446 | -0.04162 | 0.00000 | 0.00276 | 0.00000 | -0.00001 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 4

| SECOND EMBODIMENT ||||||
|---|---|---|---|---|---|
| TTL = | 5.203 | FOV = 75.511 | | f = | 4.3928 |
| SURFACE NO. | | RADIUS OF CURVATURE | THICKNESS/ DISTANCE | REFRACTIVE INDEX | ABBE NUMBER | FOCAL LENGTH |

| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S1 | FIRST LENS | 2.000 | 0.3372 | 1.546 | 56.1 | -650.934 |
| S2 | | 1.8704 | 0.0465 | | | |
| S3 | SECOND LENS | 1.6522 | 0.5836 | 1.546 | 56.1 | 2.816 |
| S4 | | -19.6958 | 0.0000 | | | |
| S5 | STOP | Infinity | 0.0300 | | | |
| S6 | THIRD LENS | 6.2669 | 0.2488 | 1.657 | 21.5 | -5.934 |
| S7 | | 2.3664 | 0.5683 | | | |
| S8 | FOURTH LENS | -80.8080 | 0.3760 | 1.657 | 21.5 | 50.816 |
| S9 | | -23.6789 | 0.5158 | | | |
| S10 | FIFTH LENS | 7.9707 | 0.5708 | 1.657 | 21.5 | -12.016 |
| S11 | | 3.8546 | 0.1000 | | | |
| S12 | SIXTH LENS | 2.0300 | 0.8560 | 1.537 | 55.7 | 945.814 |
| S13 | | 1.7378 | 0.1870 | | | |
| S14 | FILTER | Infinity | 0.2100 | 1.519 | 64.2 | |
| S15 | | Infinity | 0.5733 | | | |
| S16 | IMAGING PLANE | Infinity | 0.0000 | | | |

FIG. 7

| SECOND EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.18743 | -3.59232 | -1.39634 | 0.00000 | 36.07473 | -9.46116 | 0.00000 | 0.00000 | 10.53890 | -0.55727 | -3.28902 | -3.018956 |
| A | -0.01948 | -0.10639 | -0.09633 | -0.04556 | -0.10525 | 0.04738 | -0.06233 | -0.05280 | 0.04979 | -0.06301 | -0.26895 | -0.140750 |
| B | -0.00198 | 0.01383 | 0.07261 | 0.14459 | 0.25935 | 0.05283 | -0.07296 | -0.11119 | -0.16141 | 0.01055 | 0.14505 | 0.064376 |
| C | -0.02608 | -0.07705 | -0.29679 | -0.48803 | -0.69427 | -0.03452 | 0.20125 | 0.22685 | 0.12834 | -0.00379 | -0.04488 | -0.020565 |
| D | 0.03542 | 0.41083 | 0.91738 | 1.08398 | 1.51950 | 0.05739 | -0.25462 | -0.22780 | -0.06783 | 0.00119 | 0.00863 | 0.004214 |
| E | -0.02263 | -0.53951 | -1.16545 | -1.38727 | -2.12942 | -0.13066 | 0.17089 | 0.13381 | 0.01942 | -0.00034 | -0.00100 | -0.000515 |
| F | 0.00911 | 0.31325 | 0.71419 | 0.94884 | 1.60982 | 0.15357 | -0.04631 | -0.03783 | -0.00216 | 0.00007 | 0.00006 | 0.000034 |
| G | -0.00228 | -0.07336 | -0.17806 | -0.26940 | -0.50923 | -0.05627 | 0.00000 | 0.00347 | 0.00000 | -0.00001 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 8

| THIRD EMBODIMENT |||||||
|---|---|---|---|---|---|---|
| TTL = | 5.204 | FOV = | 74.965 | f = | 4.4347 ||
| SURFACE NO. || RADIUS OF CURVATURE | THICKNESS/ DISTANCE | REFRACTIVE INDEX | ABBE NUMBER | FOCAL LENGTH |
| S1 | FIRST LENS | 1.9977 | 0.3389 | 1.546 | 56.1 | -1016.896 |
| S2 || 1.8712 | 0.0430 ||||
| S3 | SECOND LENS | 1.6508 | 0.5879 | 1.546 | 56.1 | 2.820 |
| S4 || -20.2281 | 0.0000 ||||
| S5 | STOP | Infinity | 0.0300 ||||
| S6 | THIRD LENS | 6.2732 | 0.2534 | 1.657 | 21.5 | -5.854 |
| S7 || 2.3469 | 0.5838 ||||
| S8 | FOURTH LENS | -36.5382 | 0.3646 | 1.657 | 21.5 | 33.218 |
| S9 || -13.7224 | 0.5434 ||||
| S10 | FIFTH LENS | 7.9949 | 0.5626 | 1.657 | 21.5 | -10.000 |
| S11 || 3.5069 | 0.1000 ||||
| S12 | SIXTH LENS | 2.0300 | 0.8381 | 1.537 | 55.7 | 925.041 |
| S13 || 1.7443 | 0.1743 ||||
| S14 | FILTER | Infinity | 0.2100 | 1.519 | 64.2 ||
| S15 || Infinity | 0.5738 ||||
| S16 | IMAGING PLANE | Infinity | 0.0000 ||||

FIG. 11

| THIRD EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.18509 | -3.62409 | -1.38169 | 0.00000 | 36.04627 | -9.17735 | 0.00000 | 0.00000 | 10.53890 | -1.07861 | -3.42241 | -3.143404 |
| A | -0.01803 | -0.10807 | -0.09916 | -0.04275 | -0.10375 | 0.04946 | -0.05922 | -0.04888 | 0.04544 | -0.07295 | -0.28057 | -0.146706 |
| B | -0.00687 | 0.01771 | 0.08007 | 0.13072 | 0.24815 | 0.05071 | -0.07431 | -0.11323 | -0.15667 | 0.01434 | 0.14890 | 0.063258 |
| C | -0.01242 | -0.08446 | -0.29924 | -0.42232 | -0.66124 | -0.03453 | 0.18760 | 0.22657 | 0.12670 | -0.00326 | -0.04481 | -0.022238 |
| D | 0.00834 | 0.41624 | 0.90197 | 0.90960 | 1.43948 | 0.06998 | -0.22920 | -0.22937 | -0.06743 | 0.00017 | 0.00842 | 0.004678 |
| E | 0.00690 | -0.53510 | -1.13226 | -1.13712 | -1.99789 | -0.14154 | 0.15131 | 0.13533 | 0.01925 | 0.00005 | -0.00096 | -0.000588 |
| F | -0.00712 | 0.30429 | 0.68622 | 0.76810 | 1.50072 | 0.15817 | -0.03934 | -0.03760 | -0.00213 | 0.00001 | 0.00006 | 0.000040 |
| G | 0.00129 | -0.06964 | -0.16951 | -0.21824 | -0.47494 | -0.05777 | 0.00000 | 0.00322 | 0.00000 | 0.00000 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 12

| FOURTH EMBODIMENT ||||||
|---|---|---|---|---|---|
| TTL = 5.204 | FOV = | 74.855 | f = | 4.4463 ||
| SURFACE NO. | | RADIUS OF CURVATURE | THICKNESS/ DISTANCE | REFRACTIVE INDEX | ABBE NUMBER | FOCAL LENGTH |
| S1 | FIRST LENS | 1.9934 | 0.3389 | 1.546 | 56.1 | -240.587 |
| S2 | | 1.8457 | 0.0383 | | | |
| S3 | SECOND LENS | 1.6195 | 0.5879 | 1.546 | 56.1 | 2.790 |
| S4 | | -22.7527 | 0.0000 | | | |
| S5 | STOP | Infinity | 0.0300 | | | |
| S6 | THIRD LENS | 6.2742 | 0.2400 | 1.657 | 21.5 | -5.860 |
| S7 | | 2.3507 | 0.5894 | | | |
| S8 | FOURTH LENS | -30.3052 | 0.3646 | 1.657 | 21.5 | 34.115 |
| S9 | | -12.9503 | 0.5493 | | | |
| S10 | FIFTH LENS | 7.9949 | 0.5626 | 1.657 | 21.5 | -9.940 |
| S11 | | 3.4953 | 0.1000 | | | |
| S12 | SIXTH LENS | 2.0250 | 0.8381 | 1.537 | 55.7 | 307.698 |
| S13 | | 1.7537 | 0.1809 | | | |
| S14 | FILTER | Infinity | 0.2100 | 1.519 | 64.2 | |
| S15 | | Infinity | 0.5742 | | | |
| S16 | IMAGING PLANE | Infinity | 0.0000 | | | |

FIG. 15

| FOURTH EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.18106 | -3.66811 | -1.35882 | 0.00000 | 35.99772 | -9.04862 | 0.00000 | 0.00000 | 10.53890 | -1.05723 | -3.47657 | -3.208401 |
| A | -0.01746 | -0.10864 | -0.10035 | -0.03526 | -0.10076 | 0.04792 | -0.06366 | -0.05779 | 0.03320 | -0.08496 | -0.27749 | -0.141018 |
| B | -0.00669 | 0.00199 | 0.06937 | 0.10659 | 0.22127 | 0.05209 | -0.06035 | -0.09042 | -0.14336 | 0.02585 | 0.14932 | 0.066477 |
| C | -0.01571 | -0.03005 | -0.25522 | -0.38215 | -0.58205 | -0.01777 | 0.16354 | 0.18867 | 0.11860 | -0.00891 | -0.04569 | -0.022053 |
| D | 0.01552 | 0.34123 | 0.85058 | 0.89153 | 1.32137 | 0.04241 | -0.20451 | -0.18731 | -0.06483 | 0.00181 | 0.00868 | 0.004697 |
| E | -0.00131 | -0.48435 | -1.11158 | -1.16991 | -1.90449 | -0.12936 | 0.13809 | 0.10558 | 0.01897 | -0.00024 | -0.00100 | -0.000595 |
| F | -0.00255 | 0.28633 | 0.68756 | 0.81455 | 1.46734 | 0.16858 | -0.03612 | -0.02548 | -0.00214 | 0.00003 | 0.00006 | 0.000040 |
| G | 0.00033 | -0.06664 | -0.17127 | -0.23533 | -0.47165 | -0.06522 | 0.00000 | 0.00110 | 0.00000 | 0.00000 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 16

| FIFTH EMBODIMENT ||||||
|---|---|---|---|---|---|
| TTL = | 5.204 | FOV = | 75.144 | f = | 4.4356 |
| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S1 | FIRST LENS | 1.9971 | 0.3389 | 1.546 | 56.1 | -245.641 |
| S2 | | 1.8498 | 0.0371 | | | |
| S3 | SECOND LENS | 1.6227 | 0.5879 | 1.546 | 56.1 | 2.792 |
| S4 | | -22.3221 | 0.0000 | | | |
| S5 | STOP | Infinity | 0.0300 | | | |
| S6 | THIRD LENS | 6.2723 | 0.2400 | 1.657 | 21.5 | -5.816 |
| S7 | | 2.3394 | 0.5861 | | | |
| S8 | FOURTH LENS | -39.6312 | 0.3646 | 1.657 | 21.5 | 37.874 |
| S9 | | -15.3473 | 0.5439 | | | |
| S10 | FIFTH LENS | 7.2276 | 0.5626 | 1.657 | 21.5 | -10.703 |
| S11 | | 3.4552 | 0.1082 | | | |
| S12 | SIXTH LENS | 2.0150 | 0.8381 | 1.537 | 55.7 | 365.977 |
| S13 | | 1.7400 | 0.1827 | | | |
| S14 | FILTER | Infinity | 0.2100 | 1.519 | 64.2 | |
| S15 | | Infinity | 0.5743 | | | |
| S16 | IMAGING PLANE | Infinity | 0.0000 | | | |

FIG. 19

| FIFTH EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.16998 | -3.65040 | -1.36459 | 0.00000 | 36.00477 | -9.03222 | 0.00000 | 0.00000 | 10.53890 | -1.09845 | -3.35474 | -3.242349 |
| A | -0.01723 | -0.10874 | -0.10091 | -0.03609 | -0.10181 | 0.04812 | -0.06007 | -0.05290 | 0.03562 | -0.07630 | -0.27130 | -0.140301 |
| B | -0.00514 | 0.00761 | 0.07624 | 0.11920 | 0.23507 | 0.05563 | -0.07290 | -0.10478 | -0.14481 | 0.01831 | 0.14372 | 0.065563 |
| C | -0.02165 | -0.05613 | -0.28853 | -0.43845 | -0.64402 | -0.03948 | 0.19126 | 0.21461 | 0.11730 | -0.00515 | -0.04338 | -0.021441 |
| D | 0.02692 | 0.40078 | 0.92996 | 1.01853 | 1.46937 | 0.10744 | -0.23583 | -0.21467 | -0.06221 | 0.00073 | 0.00817 | 0.004507 |
| E | -0.01324 | -0.55668 | -1.21377 | -1.33069 | -2.10590 | -0.23845 | 0.15431 | 0.12283 | 0.01764 | -0.00006 | -0.00094 | -0.000565 |
| F | 0.00372 | 0.33107 | 0.75523 | 0.92390 | 1.61478 | 0.26283 | -0.03945 | -0.03229 | -0.00194 | 0.00002 | 0.00006 | 0.000038 |
| G | -0.00099 | -0.07777 | -0.18924 | -0.26620 | -0.51657 | -0.09820 | 0.00000 | 0.00238 | 0.00000 | 0.00000 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 20

| SIXTH EMBODIMENT ||||||
|---|---|---|---|---|---|
| TTL = 5.200 | FOV = 75.292 | | f = 4.4140 | | |
| SURFACE NO. | | RADIUS OF CURVATURE | THICKNESS/ DISTANCE | REFRACTIVE INDEX | ABBE NUMBER | FOCAL LENGTH |
| S1 | FIRST LENS | 1.9973 | 0.3389 | 1.546 | 56.1 | -183.208 |
| S2 | | 1.8409 | 0.0342 | | | |
| S3 | SECOND LENS | 1.6125 | 0.5879 | 1.546 | 56.1 | 2.781 |
| S4 | | -23.0193 | 0.0000 | | | |
| S5 | STOP | Infinity | 0.0317 | | | |
| S6 | THIRD LENS | 6.2661 | 0.2300 | 1.657 | 21.5 | -5.819 |
| S7 | | 2.3408 | 0.5852 | | | |
| S8 | FOURTH LENS | -26.9890 | 0.3646 | 1.657 | 21.5 | 35.994 |
| S9 | | -12.6758 | 0.5474 | | | |
| S10 | FIFTH LENS | 7.0156 | 0.5626 | 1.657 | 21.5 | -10.898 |
| S11 | | 3.4318 | 0.1128 | | | |
| S12 | SIXTH LENS | 2.0150 | 0.8381 | 1.537 | 55.7 | 299.625 |
| S13 | | 1.7440 | 0.1835 | | | |
| S14 | FILTER | Infinity | 0.2100 | 1.519 | 64.2 | |
| S15 | | Infinity | 0.5736 | | | |
| S16 | IMAGING PLANE | Infinity | 0.0000 | | | |

FIG. 23

| SIXTH EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.16299 | -3.66065 | -1.35478 | 0.00000 | 35.99689 | -8.95373 | 0.00000 | 0.00000 | 10.53357 | -1.17196 | -3.41845 | -3.014602 |
| A | -0.01714 | -0.10945 | -0.10208 | -0.03199 | -0.09978 | 0.04756 | -0.05900 | -0.05015 | 0.03564 | -0.07158 | -0.26477 | -0.143983 |
| B | -0.00213 | 0.01028 | 0.07738 | 0.10076 | 0.21099 | 0.04945 | -0.07673 | -0.10748 | -0.14296 | 0.01314 | 0.13852 | 0.066836 |
| C | -0.03320 | -0.07158 | -0.29237 | -0.37295 | -0.53262 | 0.00586 | 0.19764 | 0.20666 | 0.11418 | -0.00197 | -0.04151 | -0.021498 |
| D | 0.04787 | 0.44877 | 0.95792 | 0.88493 | 1.21095 | 0.00118 | -0.24343 | -0.19073 | -0.05928 | -0.00039 | 0.00780 | 0.004436 |
| E | -0.03416 | -0.62643 | -1.26905 | -1.18453 | -1.78229 | -0.10825 | 0.15846 | 0.09549 | 0.01638 | 0.00016 | -0.00089 | -0.000546 |
| F | 0.01449 | 0.37844 | 0.80000 | 0.84542 | 1.40741 | 0.18166 | -0.04302 | -0.01805 | -0.00176 | 0.00000 | 0.00006 | 0.000036 |
| G | -0.00322 | -0.09013 | -0.20243 | -0.25032 | -0.46346 | -0.07773 | 0.00000 | -0.00044 | 0.00000 | 0.00000 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 24

| SEVENTH EMBODIMENT ||||||
|---|---|---|---|---|---|
| TTL = | 5.204 | FOV = | 75.149 | f = | 4.4324 |

| SURFACE NO. | | RADIUS OF CURVATURE | THICKNESS/ DISTANCE | REFRACTIVE INDEX | ABBE NUMBER | FOCAL LENGTH |
|---|---|---|---|---|---|---|
| S1 | FIRST LENS | 1.99455 | 0.3389 | 1.546 | 56.1 | -129.579 |
| S2 | | 1.8234 | 0.0324 | | | |
| S3 | SECOND LENS | 1.5890 | 0.5879 | 1.546 | 56.1 | 2.761 |
| S4 | | -25.9465 | 0.0000 | | | |
| S5 | STOP | Infinity | 0.0300 | | | |
| S6 | THIRD LENS | 6.2609 | 0.2200 | 1.657 | 21.5 | -5.911 |
| S7 | | 2.3643 | 0.6190 | | | |
| S8 | FOURTH LENS | -26.2878 | 0.3646 | 1.657 | 21.5 | 48.648 |
| S9 | | -14.5075 | 0.5322 | | | |
| S10 | FIFTH LENS | 6.5115 | 0.5626 | 1.657 | 21.5 | -11.177 |
| S11 | | 3.3339 | 0.1096 | | | |
| S12 | SIXTH LENS | 2.0150 | 0.8381 | 1.537 | 55.7 | 194.696 |
| S13 | | 1.7560 | 0.1847 | | | |
| S14 | FILTER | Infinity | 0.2100 | 1.519 | 64.2 | |
| S15 | | Infinity | 0.5739 | | | |
| S16 | IMAGING PLANE | Infinity | 0.0000 | | | |

FIG. 27

| SEVENTH EMBODIMENT | S1 | S2 | S3 | S4 | S6 | S7 | S8 | S9 | S10 | S11 | S12 | S13 |
|---|---|---|---|---|---|---|---|---|---|---|---|---|
| K | -1.15783 | -3.70835 | -1.33827 | 0.00000 | 35.84933 | -8.91175 | 0.00000 | 0.00000 | 10.53890 | -1.27748 | -3.41612 | -3.140840 |
| A | -0.01642 | -0.10884 | -0.10396 | -0.03062 | -0.10336 | 0.04391 | -0.06570 | -0.06018 | 0.02813 | -0.07481 | -0.26147 | -0.137220 |
| B | -0.00220 | 0.00007 | 0.07960 | 0.10808 | 0.24585 | 0.06233 | -0.06073 | -0.09910 | -0.14017 | 0.01191 | 0.13156 | 0.061790 |
| C | -0.03696 | -0.05066 | -0.30629 | -0.39916 | -0.65935 | 0.01219 | 0.16266 | 0.21145 | 0.11272 | -0.00059 | -0.03768 | -0.019378 |
| D | 0.05559 | 0.45057 | 1.03193 | 0.94367 | 1.49012 | -0.10256 | -0.19838 | -0.21765 | -0.05835 | -0.00083 | 0.00683 | 0.003925 |
| E | -0.04137 | -0.66917 | -1.39574 | -1.27259 | -2.16466 | 0.10842 | 0.12918 | 0.13015 | 0.01613 | 0.00024 | -0.00076 | -0.000476 |
| F | 0.01757 | 0.41803 | 0.88900 | 0.91612 | 1.69740 | -0.00275 | -0.03264 | -0.03757 | -0.00174 | -0.00001 | 0.00005 | 0.000031 |
| G | -0.00365 | -0.10092 | -0.22454 | -0.27229 | -0.55402 | -0.02023 | 0.00000 | 0.00371 | 0.00000 | 0.00000 | 0.00000 | -0.000001 |
| H | 0.00000 | 0.00000 | 0.00000 | 0.00000 | 0.00000 | 0.00000 | 0.00000 | 0.00000 | 0.00000 | 0.00000 | 0.00000 | 0.000000 |
| J | 0.00000 | 0.00000 | 0.00000 | 0.00000 | 0.00000 | 0.00000 | 0.00000 | 0.00000 | 0.00000 | 0.00000 | 0.00000 | 0.000000 |

FIG. 28

OPTICAL IMAGING SYSTEM

CROSS-REFERENCE TO RELATED APPLICATIONS

This application is a continuation of U.S. application Ser. No. 17/124,593 filed on Dec. 17, 2020, now U.S. Pat. No. 12,007,534, which is a continuation of U.S. application Ser. No. 15/084,696 filed on Mar. 30, 2016, now U.S. Pat. No. 10,901,182, which claims the benefit under 35 USC 119(a) of Korean Patent Application No. 10-2015-0166750 filed on Nov. 26, 2015, in the Korean Intellectual Property Office, the entire disclosures of which are incorporated herein by reference for all purposes.

BACKGROUND

1. Field

The present disclosure relates to an optical imaging system having lenses.

2. Description of Related Art

A compact camera module may be mounted in a portable terminal. For example, such a compact camera module may be mounted in a thinned device such as a mobile phone, or other device. The compact camera module may include an optical imaging system including a small number of lenses so that it may be thinned. For example, the compact camera module may have an optical imaging system including four or fewer lenses.

However, it is difficult for an optical imaging system having a small number of lenses to provide a camera having a high level of resolution. Therefore, there is a desire to develop an optical imaging system capable of realizing both high resolution and thinning of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a negative refractive power, a convex object-side surface, and a concave image-side surface; a second lens having a positive refractive power; a third lens having a negative refractive power; a fourth lens having a positive refractive power; a fifth lens having a negative refractive power; and a sixth lens having a positive refractive power and an image-side surface having an inflection point. The first to sixth lenses are sequentially disposed in ascending numerical order from an object side of the optical imaging system toward an imaging plane of the optical imaging system.

An object-side surface of the second lens may be convex. An object-side surface of the third lens may be convex. An object-side surface of the fourth lens may be concave. An image-side surface of the fifth lens may be concave.

The optical imaging system may further include a stop disposed between the second lens and the third lens.

A difference between an Abbe number of the first lens and an Abbe number of the third lens may be greater than 25 and less than 45.

A difference between an Abbe number of the first lens and an Abbe number of the fifth lens may be greater than 25 and less than 45.

A ratio of a focal length of the second lens to an overall focal length of the optical imaging system may be greater than 0.3 and less than 1.20.

An absolute value of a ratio of a focal length of the fourth lens to an overall focal length of the optical imaging system may be greater than 3.0.

A ratio of a distance from the object-side surface of the first lens to the imaging plane to an overall focal length of the optical imaging system may be less than 1.4.

A ratio of a distance from the image-side surface of the sixth lens to the imaging plane to an overall focal length of the optical imaging system may be less than 0.4.

A ratio of a distance from the image-side surface of the first lens to an object-side surface of the second lens to an overall focal length of the optical imaging system may be less than 0.1.

A ratio of a radius of curvature of an image-side surface of the third lens to an overall focal length of the optical imaging system may be greater than 0.3 and less than 1.4.

A ratio of a radius of curvature of an image-side surface of the fifth lens to an overall focal length of the optical imaging system may be less than 1.7.

In another general aspect, an optical imaging system includes a first lens having a convex object-side surface, a second lens having a convex object-side surface and a convex image-side surface, a third lens having a convex object-side surface, a fourth lens having a concave object-side surface, a fifth lens having a concave image-side surface, and a sixth lens having an image-side surface having an inflection point. The first to sixth lenses are sequentially disposed in ascending numerical order from an object side of the optical imaging system toward an imaging plane of the optical imaging system.

A difference between an Abbe number of the first lens and an Abbe number of the fifth lens may be greater than 25 and less than 45.

Other features and aspects will be apparent from the following detailed description, the drawings, and the claims.

BRIEF DESCRIPTION OF DRAWINGS

FIG. 3 is a table displaying characteristics of lenses of the optical imaging system illustrated in FIG. 1.

FIG. 4 is a table displaying aspherical characteristics of the optical imaging system illustrated in FIG. 1.

FIG. 7 is a table displaying characteristics of lenses of the optical imaging system illustrated in FIG. 5.

FIG. 8 is a table displaying aspherical characteristics of the optical imaging system illustrated in FIG. 5.

FIG. 11 is a table displaying characteristics of lenses of the optical imaging system illustrated in FIG. 9.

FIG. 12 is a table displaying aspherical characteristics of the optical imaging system illustrated in FIG. 9.

FIG. 15 is a table displaying characteristics of lenses of the optical imaging system illustrated in FIG. 13.

FIG. 16 is a table displaying aspherical characteristics of the optical imaging system illustrated in FIG. 13.

FIG. 19 is a table displaying characteristics of lenses of the optical imaging system illustrated in FIG. 17.

FIG. 20 is a table displaying aspherical characteristics of the optical imaging system illustrated in FIG. 17.

FIG. 23 is a table displaying characteristics of lenses of the optical imaging system illustrated in FIG. 21.

FIG. 24 is a table displaying aspherical characteristics of the optical imaging system illustrated in FIG. 21.

FIG. 27 is a table displaying characteristics of lenses of the optical imaging system illustrated in FIG. 25.

FIG. 28 is a table displaying aspherical characteristics of the optical imaging system illustrated in FIG. 25.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
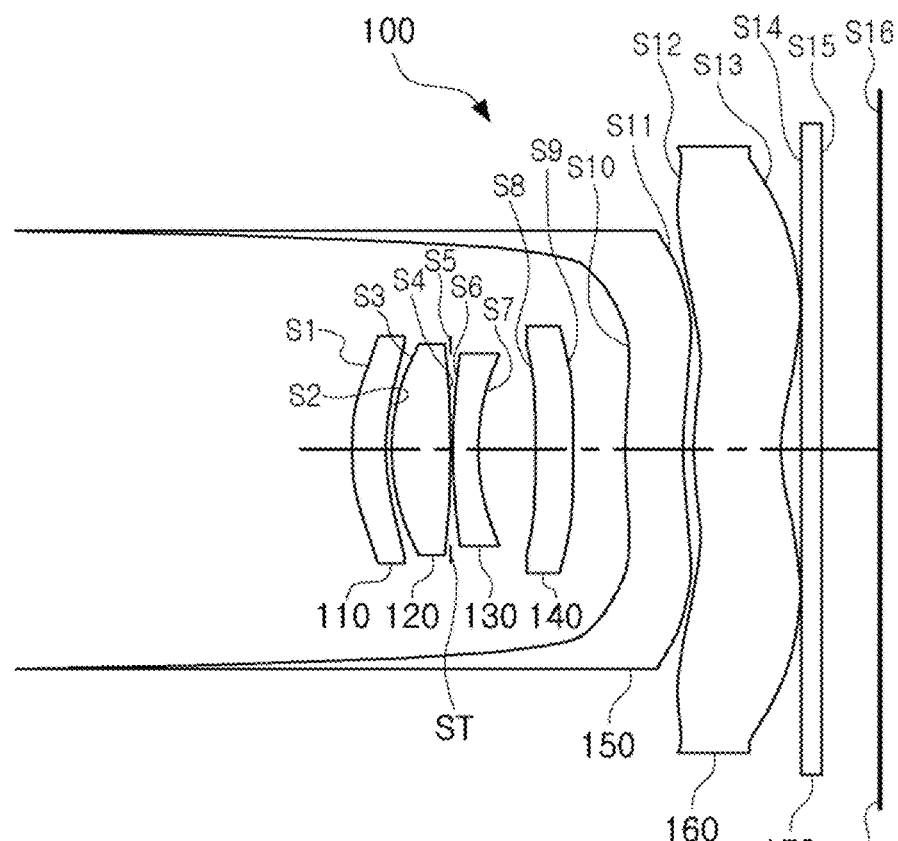
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc., may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

In addition, a first lens refers to a lens closest to an object (or a subject), while a sixth lens refers to a lens closest to an imaging plane (or an image sensor). In addition, all of radii of curvature and thicknesses of lenses, a TTL, an Img HT (one half of a diagonal length of the imaging plane), and focal lengths are represented in millimeters (mm). Further, thicknesses of the lenses, gaps between the lenses, and the TTL are distances taken on optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, even in the case that the surface of a lens is described as being convex, an edge portion of the lens may be concave. Likewise, even in the case that the surface of a lens is described as concave, an edge portion of the lens may be convex.

An optical imaging system may include six lenses sequentially disposed in ascending numerical order from an object side of the optical imaging system toward an imaging plane of the optical imaging system.

The first lens may have a negative refractive power. One surface of the first lens may be convex. For example, an object-side surface of the first lens may be convex. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The second lens may have a positive refractive power. At least one surface of the second lens may be convex. For example, an object-side surface of the second lens may be convex. The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass. The second lens may be formed of the same material as that of the first lens. For example, a refractive index and an Abbe number of the second lens may be the same as those of the first lens.

The third lens may have a negative refractive power. One surface of the third lens may be convex. For example, an object-side surface of the third lens may be convex. The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The fourth lens may have a positive refractive power. One surface of the fourth lens may be concave. For example, an object-side surface of the fourth lens may be concave. The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass. The fourth lens may be formed of the same material as that of the third lens. For example, a refractive index and an Abbe number of the fourth lens may be the same as those of the third lens.

The fifth lens may have a negative refractive power. One surface of the fifth lens may be concave. For example, an image-side surface of the fifth lens may be concave. The fifth lens may have an aspherical surface. For example, both surfaces of the fifth lens may be aspherical. The fifth lens may have inflection points. For example, one or more inflection points may be formed on an object-side surface and the image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass. The fifth lens may be formed of the same material as that of the third lens. For example, a refractive index and an Abbe number of the fifth lens may be the same as those of the third lens.

The sixth lens may have a positive refractive power. One surface of the sixth lens may be concave. For example, an image-side surface of the sixth lens may be concave. The sixth lens may have inflection points. For example, one or more inflection points may be formed on both surfaces of the sixth lens. The sixth lens may have an aspherical surface. For example, both surfaces of the sixth lens may be aspherical. The sixth lens may be formed of a material having high light transmissivity and excellent workability. For example, the sixth lens may be formed of plastic. However, a material of the sixth lens is not limited to plastic. For example, the sixth lens may be formed of glass.

The first to sixth lenses may have an aspherical shape, as described above. For example, at least one surface of all of the first to sixth lenses may be aspherical. Here, an aspherical surface of each lens may be represented by the following Equation 1:

$$Z = \frac{cr^f}{1+\sqrt{1-(1+k)c^2 r^2}} + Ar^4 + Br^6 + Cr^8 + Dr^{10} + Er^{12} + Fr^{14} + Gr^{16} + Hr^{18} + Jr^{20} \qquad (1)$$

Here, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

The optical imaging system may include a stop. The stop may be disposed between the second and third lenses.

The optical imaging system may include a filter. The filter may filter a certain wavelength of light from incident light incident through the first to sixth lenses. For example, the filter may filter an infrared wavelength of the incident light. The filter may be manufactured at a thin thickness. To this end, the filter may be formed of plastic.

The optical imaging system may include an image sensor. The image sensor may provide the imaging plane on which light refracted by the lenses may be imaged. For example, a surface of the image sensor may form the imaging plane. The image sensor may be configured to realize high resolution. For example, a unit size of pixels configuring the image sensor may be 1.12 μm or less.

The optical imaging system may satisfy the following Conditional Expressions:

| | |
|---|---|
| $f1/f < 0$ | (Conditional Expression 1) |
| $V1 - V2 < 45$ | (Conditional Expression 2) |
| $25 < V1 - V3 < 45$ | (Conditional Expression 3) |
| $25 < V1 - V5 < 45$ | (Conditional Expression 4) |
| $0.3 < f2/f < 1.20$ | (Conditional Expression 5) |
| $-3.0 < f3/f < -1.0$ | (Conditional Expression 6) |
| $3.0 < |f4/f|$ | (Conditional Expression 7) |
| $-10.0 < f5/f < 0$ | (Conditional Expression 8) |
| $TTL/f < 1.4$ | (Conditional Expression 9) |
| $f1/f2 < 0$ | (Conditional Expression 10) |
| $-1.2 < f2/f3 < 0$ | (Conditional Expression 11) |
| $BFL/f < 0.4$ | (Conditional Expression 12) |
| $D12/f < 0.1$ | (Conditional Expression 13) |
| $0.3 < R7/f < 1.4$ | (Conditional Expression 14) |
| $R11/f < 1.7$ | (Conditional Expression 15) |

In one or more embodiments, f is an overall focal length of the optical imaging system, f1 is a focal length of the first lens, f2 is a focal length of the second lens, f3 is a focal length of the third lens, f4 is a focal length of the fourth lens, f5 is a focal length of the fifth lens, V1 is an Abbe number of the first lens, V2 is an Abbe number of the second lens, V3 is an Abbe number of the third lens, V5 is an Abbe number of the fifth lens, TTL is a distance from the object-side surface of the first lens to the imaging plane, BFL is a distance from the image-side surface of the sixth lens to the imaging plane, D12 is a distance from an image-side surface of the first lens to the object-side surface of the second lens, R7 is a radius of curvature of an image-side surface of the third lens, and R11 is a radius of curvature of the image-side surface of the fifth lens.

The optical imaging system satisfying the above Conditional Expressions may be miniaturized, and may allow high resolution images to be realized.

Next, optical imaging systems according to several embodiments will be described.

Referring to FIG. 1, an optical imaging system 100 according to the first embodiment includes a plurality of lenses each having a refractive power. For example, the optical imaging system 100 includes a first lens 110, a second lens 120, a third lens 130, a fourth lens 140, a fifth lens 150, and a sixth lens 160.

The first lens 110 has a negative refractive power, and an object-side surface S1 thereof is convex and an image-side surface S2 thereof is concave. The second lens 120 has a positive refractive power, and both surfaces S3 and S4 thereof are convex. The third lens 130 has a negative refractive power, and an object-side surface S6 thereof is convex and an image-side surface S7 thereof is concave. The fourth lens 140 has a positive refractive power, and an object-side surface S8 thereof is concave and an image-side surface S9 thereof is convex. The fifth lens 150 has a negative refractive power, and an object-side surface S10 thereof is convex and an image-side surface S11 thereof is concave. In addition, inflection points are formed on both surfaces S10 and S11 of the fifth lens 150. For example, the object-side surface S10 of the fifth lens 150 is convex in a paraxial region thereof, and concave in the vicinity of the paraxial region. Similarly, the image-side surface S11 of the fifth lens is concave in a paraxial region thereof, and convex in the vicinity of the paraxial region. The sixth lens 160 has a positive refractive power, and an object-side surface S12 thereof is convex and an image-side surface S13 thereof is concave. In addition, inflection points are formed on both surfaces S12 and S13 of the sixth lens 160. For example, the object-side surface S12 of the sixth is be convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 100 includes a stop ST having a surface S5. For example, the stop ST is disposed between the second lens 120 and the third lens 130. However, the location of the stop ST is not limited to between the second lens 120 and the third lens 130 and the location of the stop ST may be varied as desired. The stop ST disposed as described above adjusts an amount of light incident on an imaging plane 180.

The optical imaging system 100 includes a filter 170 having an object-side surface S14 and an image-side surface S15. For example, the filter 170 is disposed between the sixth lens 160 and the imaging plane 180. However, the location of the filter 170 is not limited to between the sixth lens 160 and the imaging plane 180 and the location of the filter 170 may be varied as desired. The filter 170 disposed as described above filters infrared rays from being incident on the imaging plane 180.

The optical imaging system 100 includes an image sensor. The imaging plane 180 is provided by the surface S16 of the image sensor, on which light refracted through the lenses is incident. In addition, the image sensor converts an optical signal incident on the imaging plane 180 into an electrical signal. In other words, the image sensor converts light incident to the imaging plane 180 into an electrical signal.

The optical imaging system 100 configured as described above may have a low F number. For example, an F number of the optical imaging system according to the first embodiment is 2.09.

Figure 2:
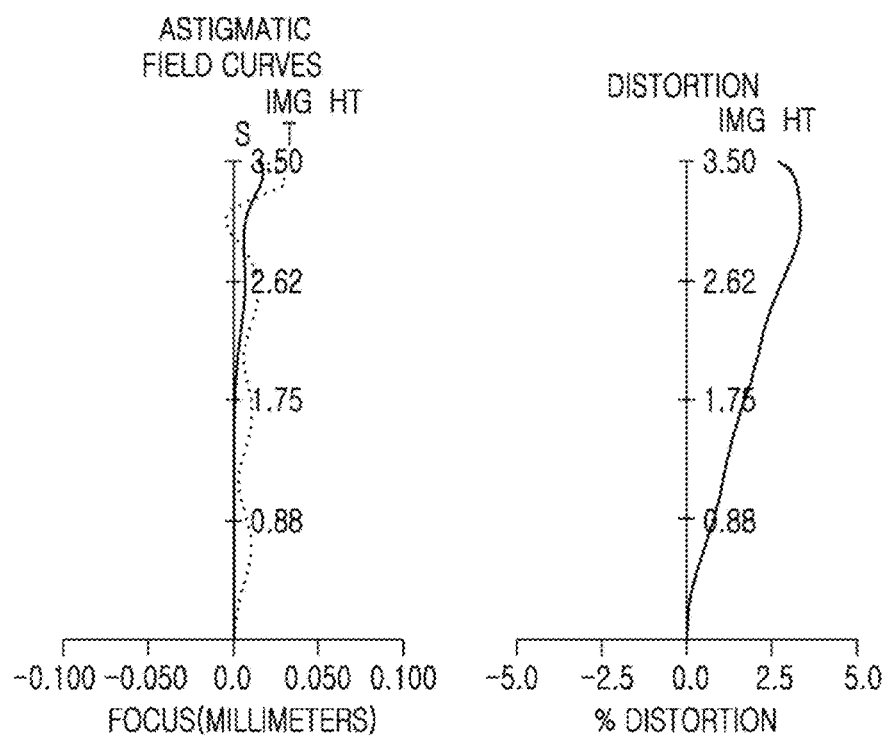
FIG. 2 is graphs illustrating aberration curves of the optical imaging system illustrated in FIG. 1.

The optical imaging system according to the first embodiment has aberration characteristics as illustrated in FIG. 2. FIGS. 3 and 4 are tables illustrating characteristics of lenses and aspherical characteristics of the optical imaging system according to the first embodiment.

Figure 5:
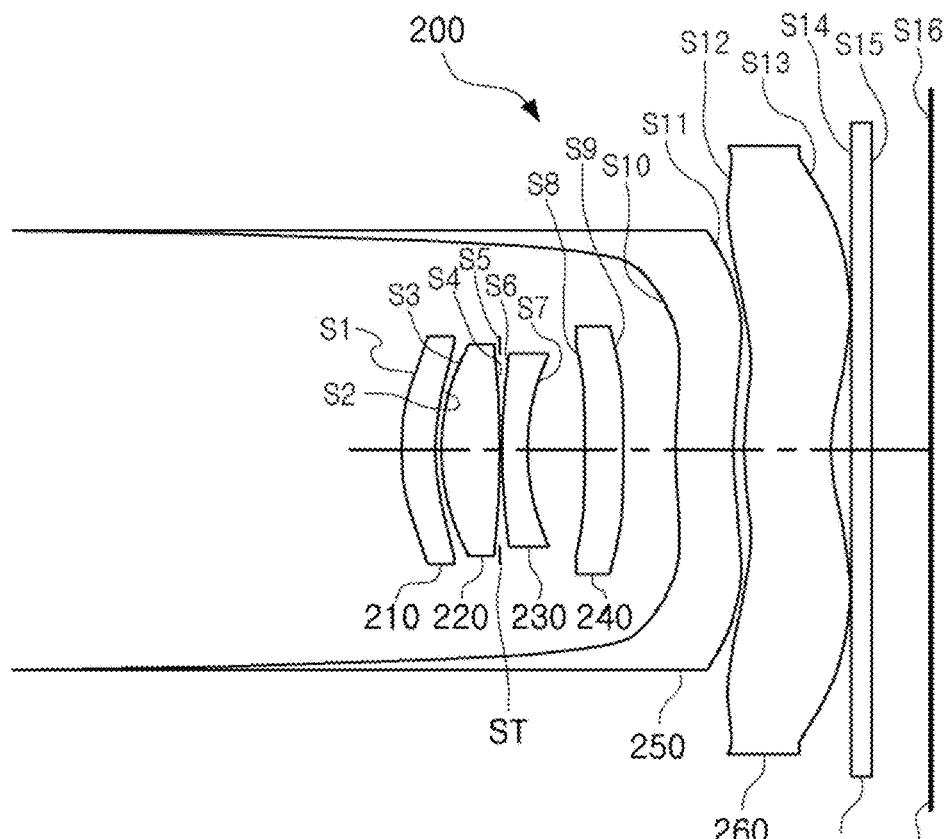
FIG. 5 is a view of an optical imaging system according to a second embodiment.

Referring to FIG. 5, an optical imaging system 200 according to a second embodiment includes a plurality of lenses each having a refractive power. For example, the optical imaging system 200 includes a first lens 210, a second lens 220, a third lens 230, a fourth lens 240, a fifth lens 250, and a sixth lens 260.

The first lens 210 has a negative refractive power, and an object-side surface S1 thereof is convex and an image-side surface S2 thereof is concave. The second lens 220 has a positive refractive power, and both surfaces S3 and S4 thereof are convex. The third lens 230 has a negative refractive power, and an object-side surface S6 thereof is convex and an image-side surface S7 thereof is concave. The fourth lens 240 has a positive refractive power, and an object-side surface S8 thereof is concave and an image-side surface S9 thereof is convex. The fifth lens 250 has a negative refractive power, and an object-side surface S10 thereof is convex and an image-side surface S11 thereof is concave. In addition, inflection points are formed on both surfaces S10 and S11 of the fifth lens 250. For example, the object-side surface S10 of the fifth lens 250 is convex in a paraxial region thereof, and concave in the vicinity of the paraxial region. Similarly, the image-side surface S11 of the fifth lens is concave in a paraxial region thereof, and convex in the vicinity of the paraxial region. The sixth lens 260 has a positive refractive power, and an object-side surface S12 thereof is convex and an image-side surface S13 thereof is concave. In addition, inflection points are formed on both surfaces S12 and S13 of the sixth lens 260. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 200 includes a stop ST having a surface S5. For example, the stop ST is disposed between the second lens 220 and the third lens 230. However, the location of the stop ST is not limited to between the second lens 220 and the third lens 230 and the location of the stop ST may be varied as desired. The stop ST disposed as described above may adjust an amount of light incident on an imaging plane 280.

The optical imaging system 200 includes a filter 270 having an object-side surface S14 and an image-side surface S15. For example, the filter 270 is disposed between the sixth lens 260 and the imaging plane 280. However, the location of the filter 270 is not limited to between the sixth lens 260 and the imaging plane 280 and the location of the filter 270 may be varied as desired. The filter 270 disposed as described above filters infrared rays from being incident on the imaging plane 280.

The optical imaging system 200 includes an image sensor. The imaging plane 280 is provided by a surface S16 of the image sensor, on which light refracted through the lenses is incident. In addition, the image sensor may convert an optical signal incident on the imaging plane 280 into an electrical signal. In other words, the image sensor converts light incident to the imaging plane 280 into an electrical signal.

The optical imaging system 200 configured as described above may have a low F number. For example, an F number of the optical imaging system according to the second embodiment is 2.09.

Figure 6:
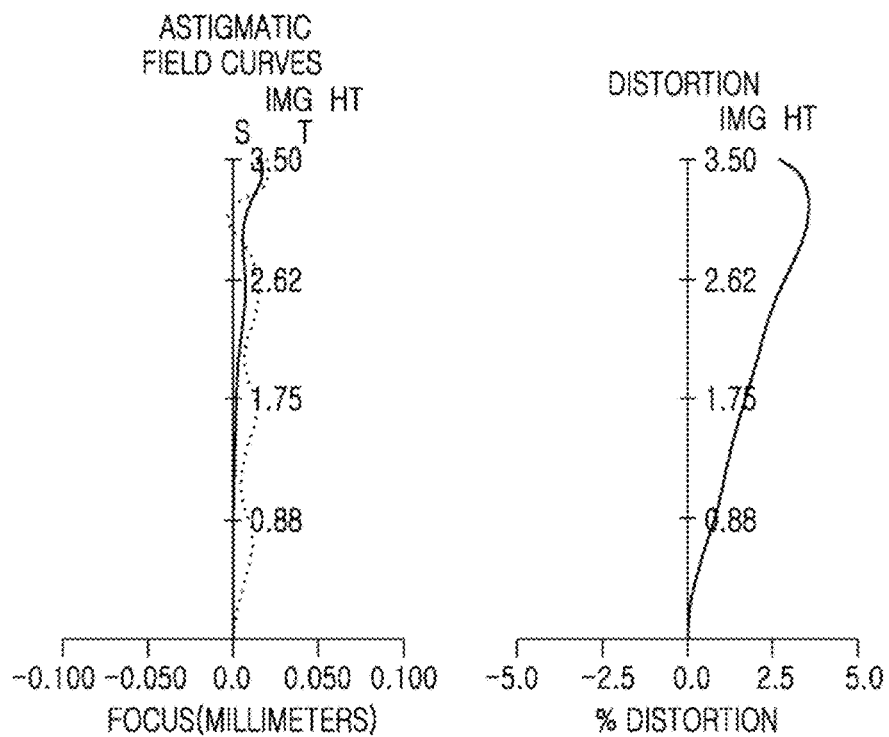
FIG. 6 is graphs illustrating aberration curves of the optical imaging system illustrated in FIG. 5.

The optical imaging system according to the second embodiment has aberration characteristics as illustrated in FIG. 6. FIGS. 7 and 8 are tables illustrating characteristics of lenses and aspherical characteristics of the optical imaging system according to the second embodiment.

Figure 9:
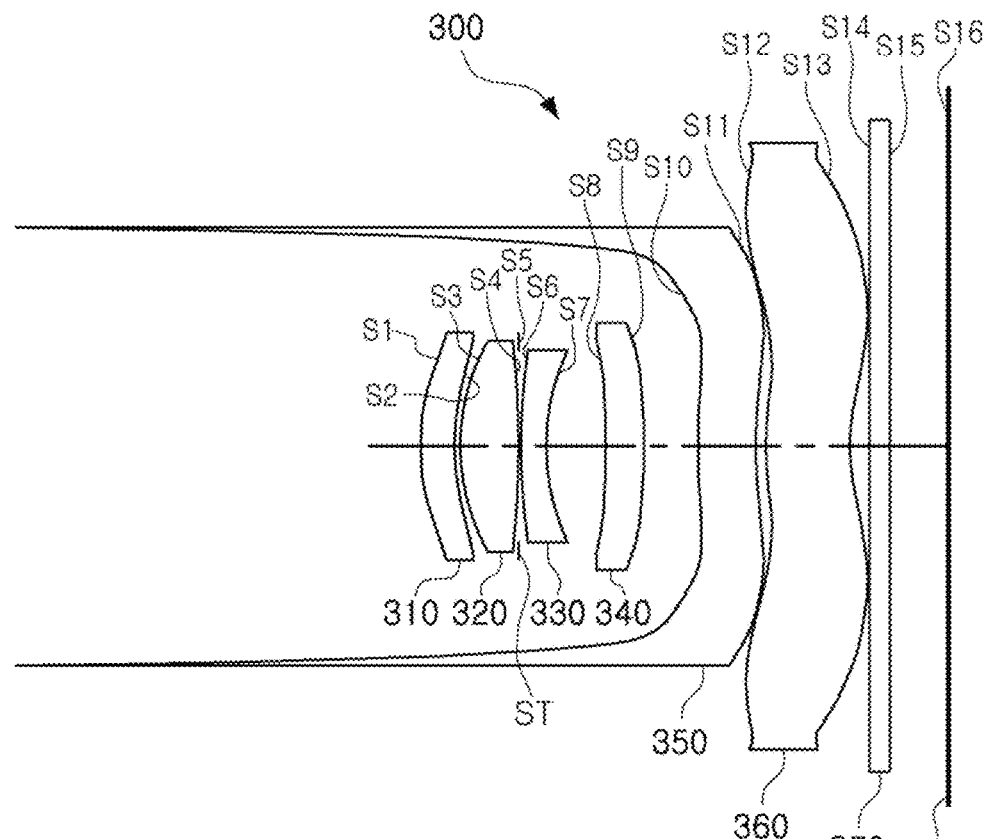
FIG. 9 is a view of an optical imaging system according to a third embodiment.

Referring to FIG. 9, an optical imaging system 300 according to a third embodiment includes a plurality of lenses each having a refractive power. For example, the optical imaging system 300 includes a first lens 310, a second lens 320, a third lens 330, a fourth lens 340, a fifth lens 350, and a sixth lens 360.

The first lens 310 has a negative refractive power, and an object-side surface S1 thereof is convex and an image-side surface S2 thereof is concave. The second lens 320 has a positive refractive power, and both surfaces S3 and S4 thereof are convex. The third lens 330 has a negative refractive power, and an object-side surface S6 thereof is convex and an image-side surface S7 thereof is concave. The fourth lens 340 has a positive refractive power, and an object-side surface S8 thereof is concave and an image-side surface S9 thereof is convex. The fifth lens 350 has a negative refractive power, and an object-side surface S10 thereof is convex and an image-side surface S11 thereof is concave. In addition, inflection points are formed on both surfaces S10 and S11 of the fifth lens 350. For example, the object-side surface S10 of the fifth lens 350 is convex in a paraxial region thereof, and concave in the vicinity of the paraxial region. Similarly, the image-side surface S11 of the fifth lens is concave in a paraxial region thereof, and convex in the vicinity of the paraxial region. The sixth lens 360 has a positive refractive power, and an object-side surface S12 thereof is convex and an image-side surface S13 thereof is concave. In addition, inflection points are formed on both surfaces S12 and S13 of the sixth lens 360. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 300 includes a stop ST having a surface S5. For example, the stop ST is disposed between the second lens 320 and the third lens 330. However, the location of the stop ST is not limited to between the second lens 320 and the third lens 330 and the location of the stop ST may be varied as desired. The stop ST disposed as described above may adjust an amount of light incident on an imaging plane 380.

The optical imaging system 300 includes a filter 370 having an object-side surface S14 and an image-side surface S15. For example, the filter 370 is disposed between the sixth lens 360 and the imaging plane 380. However, the location of the filter 370 is not limited to between the sixth lens 360 and the imaging plane 380 and the location of the filter 370 may be varied as desired. The filter 370 disposed as described above filters infrared rays from being incident on the imaging plane 380.

The optical imaging system 300 includes an image sensor. The imaging plane 380 is provided by a surface S16 of the image sensor, on which light refracted through the lenses is incident. In addition, the image sensor converts an optical signal incident on the imaging plane 380 into an electrical signal. In other words, the image sensor converts light incident to the imaging plane 380 into an electrical signal.

The optical imaging system 300 configured as described above has a low F number. For example, an F number of the optical imaging system according to the third embodiment is 2.11.

Figure 10:
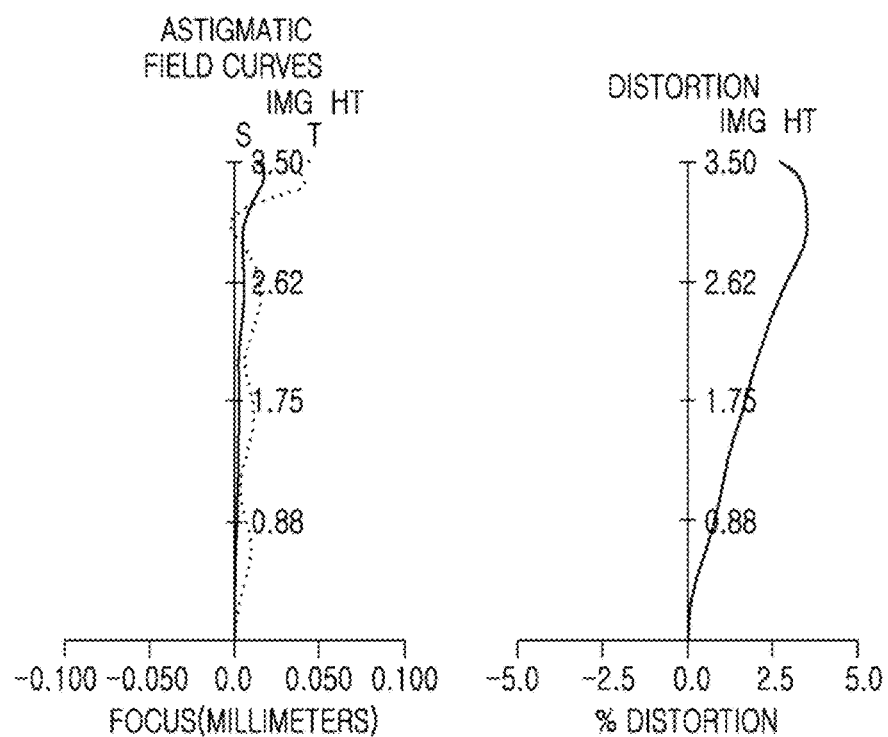
FIG. 10 is graphs illustrating aberration curves of the optical imaging system illustrated in FIG. 9.

The optical imaging system according to the third embodiment has aberration characteristics as illustrated in FIG. 10. FIGS. 11 and 12 are tables illustrating characteristics of lenses and aspherical characteristics of the optical imaging system according to the third embodiment.

Figure 13:
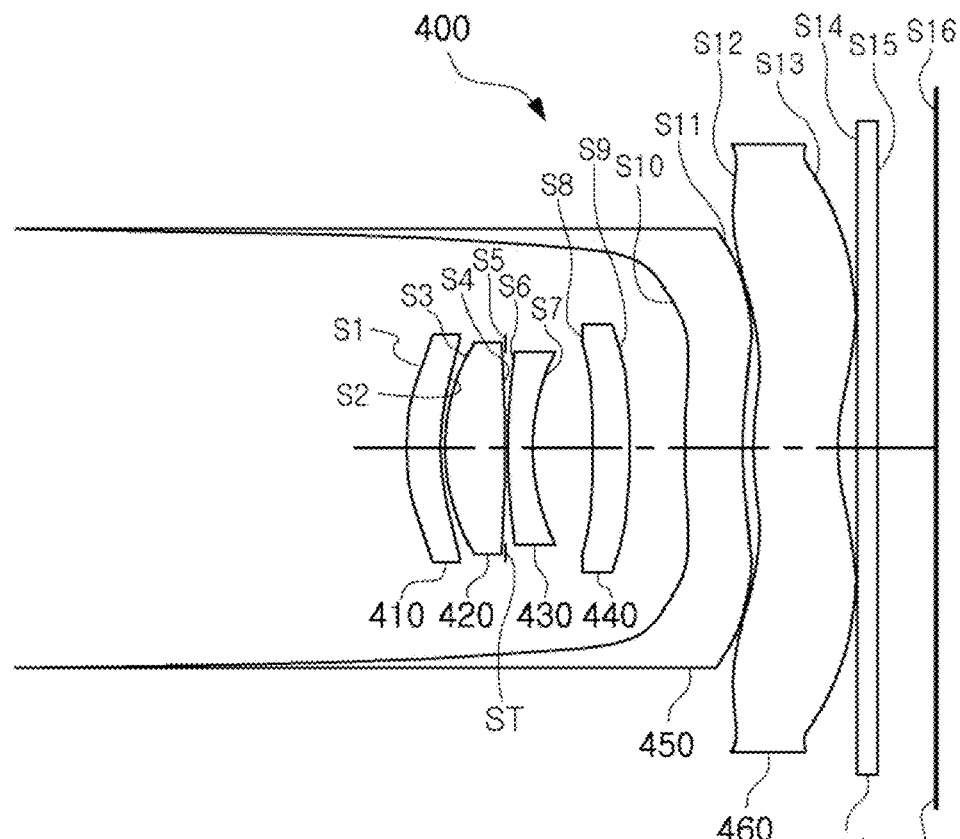
FIG. 13 is a view of an optical imaging system according to a fourth embodiment.

Referring to FIG. 13, an optical imaging system 400 according to a fourth embodiment includes a plurality of lenses each having a refractive power. For example, the optical imaging system 400 includes a first lens 410, a second lens 420, a third lens 430, a fourth lens 440, a fifth lens 450, and a sixth lens 460.

The first lens 410 has a negative refractive power, and an object-side surface S1 thereof is convex and an image-side surface S2 thereof is concave. The second lens 420 has a positive refractive power, and both surfaces S3 and S4 thereof are convex. The third lens 430 has a negative refractive power, and an object-side surface S6 thereof is convex and an image-side surface S7 thereof is concave. The fourth lens 440 has a positive refractive power, and an object-side surface S8 thereof is concave and an image-side surface S9 thereof is convex. The fifth lens 450 has a negative refractive power, and an object-side surface S10 thereof is convex and an image-side surface S11 thereof is concave. In addition, inflection points are formed on both surfaces S10 and S11 of the fifth lens 450. For example, the object-side surface S10 of the fifth lens 450 is convex in a paraxial region thereof, and concave in the vicinity of the paraxial region. Similarly, the image-side surface S11 of the fifth lens is concave in a paraxial region thereof, and convex in the vicinity of the paraxial region. The sixth lens 460 has a positive refractive power, and an object-side surface S12 thereof is convex and an image-side surface S13 thereof is concave. In addition, inflection points are formed on both surfaces S12 and S13 of the sixth lens 460. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 400 includes a stop ST having a surface S5. For example, the stop ST is disposed between the second lens 420 and the third lens 430. However, the location of the stop ST is not limited to between the second lens 420 and the third lens 430 and the location of the stop ST may be varied as desired. The stop ST disposed as described above adjusts an amount of light incident on an imaging plane 480.

The optical imaging system 400 includes a filter 470 having an object-side surface S14 and an image-side surface S15. For example, the filter 470 is disposed between the sixth lens 460 and the imaging plane 480. However, the location of the filter 470 is not limited to between the sixth lens 460 and the imaging plane 480 and the location of the filter 470 may be varied as desired. The filter 470 disposed as described above filters infrared rays from being incident on the imaging plane 480.

The optical imaging system 400 includes an image sensor. The imaging plane 480 is provided by a surface S16 of the image sensor, on which light refracted through the lenses is incident. In addition, the image sensor converts an optical signal incident on the imaging plane 480 into an electrical signal. In other words, the image sensor converts light incident to the imaging plane 480 into an electrical signal.

The optical imaging system 400 configured as described above has a low F number. For example, an F number of the optical imaging system according to the fourth embodiment may be 2.12.

Figure 14:
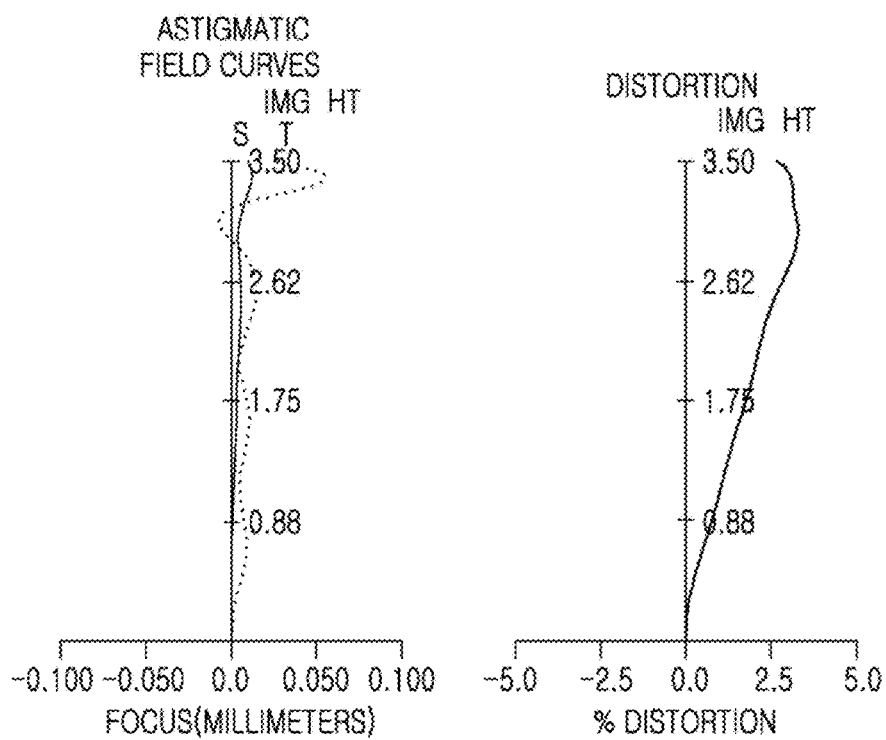
FIG. 14 is graphs illustrating aberration curves of the optical imaging system illustrated in FIG. 13.

The optical imaging system according to the fourth embodiment has aberration characteristics as illustrated in FIG. 14. FIGS. 15 and 16 are tables illustrating characteristics of lenses and aspherical characteristics of the optical imaging system according to the fourth embodiment.

Figure 17:
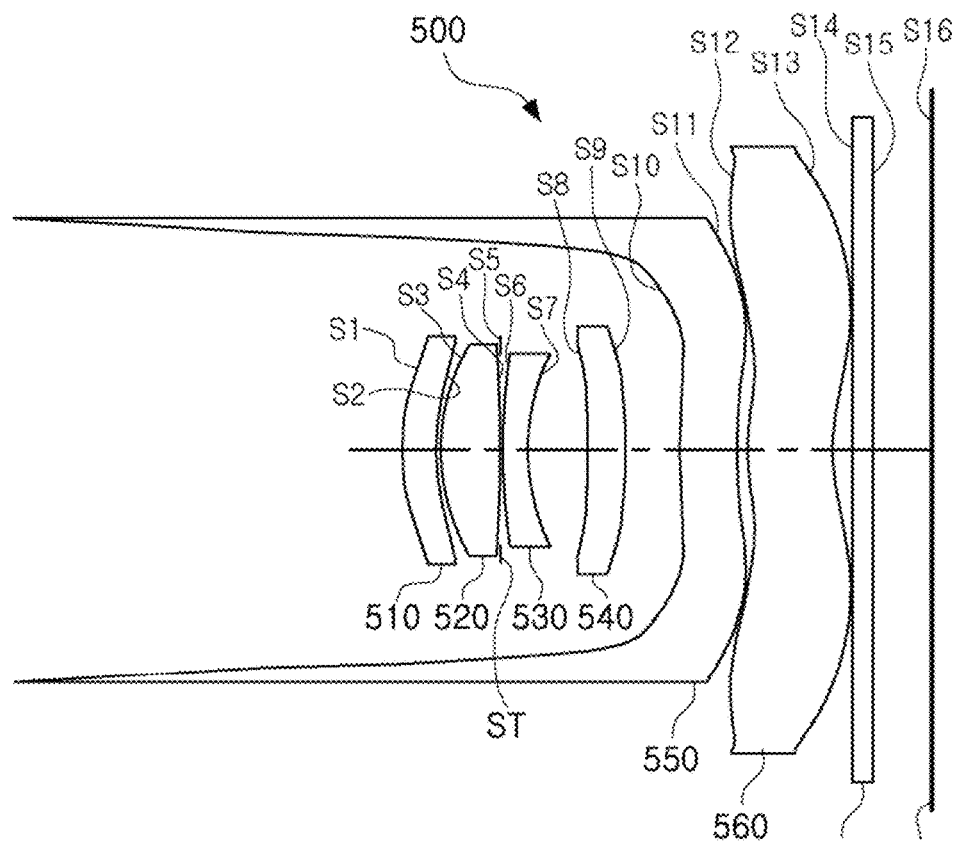
FIG. 17 is a view of an optical imaging system according to a fifth embodiment.

Referring to FIG. 17, an optical imaging system 500 according to a fifth embodiment includes a plurality of lenses each having a refractive power. For example, the optical imaging system 500 includes a first lens 510, a second lens 520, a third lens 530, a fourth lens 540, a fifth lens 550, and a sixth lens 560.

The first lens 510 has a negative refractive power, and an object-side surface S1 thereof is convex and an image-side surface S2 thereof is concave. The second lens 520 has a positive refractive power, and both surfaces S3 and S4 thereof are convex. The third lens 530 has a negative refractive power, and an object-side surface S6 thereof is convex and an image-side surface S7 thereof is concave. The fourth lens 540 has a positive refractive power, and an object-side surface S8 thereof is concave and an image-side surface S9 thereof is convex. The fifth lens 550 has a negative refractive power, and an object-side surface S10 thereof is convex and an image-side surface S11 thereof is concave. In addition, inflection points are formed on both surfaces S10 and S11 of the fifth lens 550. For example, the object-side surface S10 of the fifth lens 550 is convex in a paraxial region thereof, and concave in the vicinity of the paraxial region. Similarly, the image-side surface S11 of the fifth lens 550 is concave in a paraxial region thereof, and convex in the vicinity of the paraxial region. The sixth lens 560 has a positive refractive power, and an object-side surface S12 thereof is convex and an image-side surface S13 thereof is concave. In addition, inflection points are formed on both surfaces S12 and S13 of the sixth lens 560. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 500 includes a stop ST having a surface S5. For example, the stop ST is disposed between the second lens 520 and the third lens 530. However, the location of the stop ST is not limited to between the second lens 520 and the third lens 530 and the location of the stop ST may be varied as desired. The stop ST disposed as described above adjusts an amount of light incident on an imaging plane 580.

The optical imaging system 500 includes a filter 570 having an object-side surface S14 and an image-side surface S15. For example, the filter 570 is disposed between the sixth lens 560 and the imaging plane 580. However, the location of the filter 570 is not limited to between the sixth lens 560 and the imaging plane 580 and the location of the filter 570 may be varied as desired. The filter 570 disposed as described above filters infrared rays from being incident on the imaging plane 580.

The optical imaging system 500 includes an image sensor. The imaging plane 580 is provided by a surface S16 of the image sensor, on which light refracted through the lenses is incident. In addition, the image sensor converts an optical signal incident on the imaging plane 580 into an electrical signal. In other words, the image sensor converts light incident to the imaging plane 580 into an electrical signal.

The optical imaging system 500 configured as described above has a low F number. For example, an F number of the optical imaging system according to the fifth embodiment is 2.11.

Figure 18:
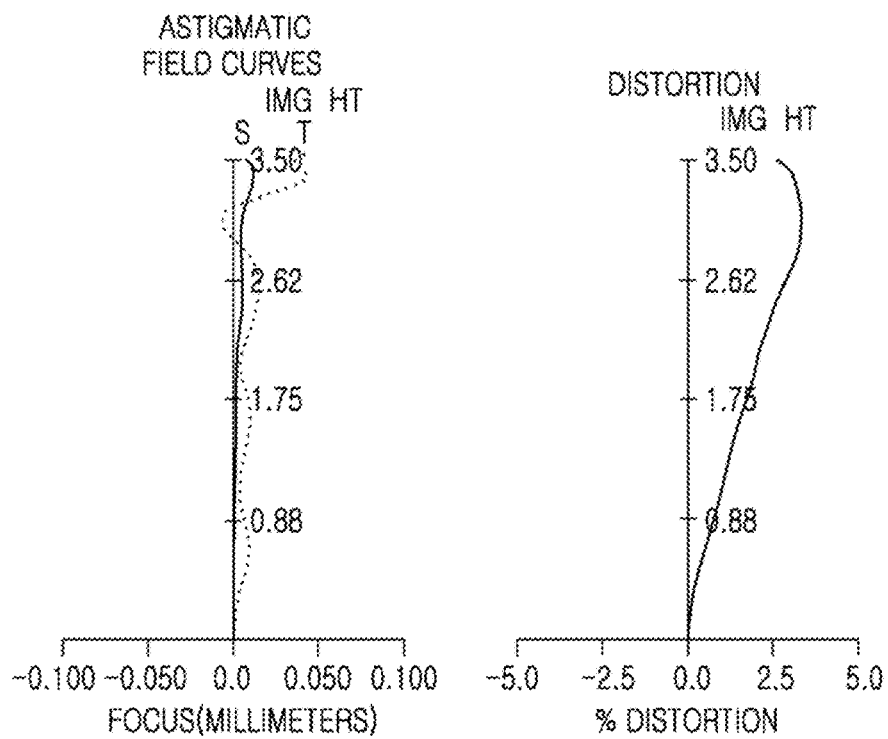
FIG. 18 is graphs illustrating aberration curves of the optical imaging system illustrated in FIG. 17.

The optical imaging system according to the fifth embodiment has aberration characteristics as illustrated in FIG. 18. FIGS. 19 and 20 are tables illustrating characteristics of lenses and aspherical characteristics of the optical imaging system according to the fifth embodiment.

Figure 21:
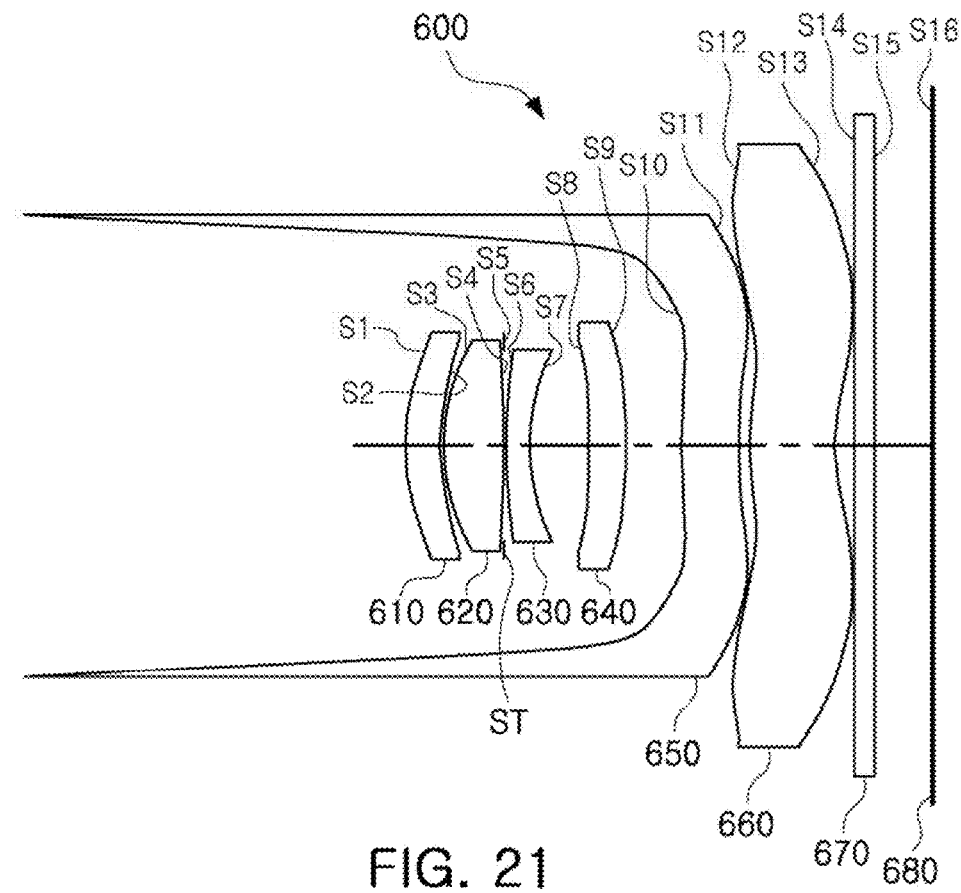
FIG. 21 is a view of an optical imaging system according to a sixth embodiment.

Referring to FIG. 21, an optical imaging system 600 according to the sixth embodiment includes a plurality of lenses each having a refractive power. For example, the optical imaging system 600 includes a first lens 610, a second lens 620, a third lens 630, a fourth lens 640, a fifth lens 650, and a sixth lens 660.

The first lens 610 has a negative refractive power, and an object-side surface S1 thereof is convex and an image-side surface S2 thereof is concave. The second lens 620 has a positive refractive power, and both surfaces S3 and S4 thereof are convex. The third lens 630 has a negative refractive power, and an object-side surface S6 thereof is convex and an image-side surface S7 thereof is concave. The fourth lens 640 has a positive refractive power, and an object-side surface S8 thereof is concave and an image-side surface S9 thereof is convex. The fifth lens 650 has a negative refractive power, and an object-side S10 surface thereof is convex and an image-side surface S11 thereof is concave. In addition, inflection points are formed on both surfaces S10 and S11 of the fifth lens 650. For example, the object-side surface S10 of the fifth lens 650 is convex in a paraxial region thereof, and concave in the vicinity of the paraxial region. Similarly, the image-side surface S11 of the fifth lens 650 is concave in a paraxial region thereof, and convex in the vicinity of the paraxial region. The sixth lens 660 has a positive refractive power, and an object-side surface S12 thereof is convex and an image-side surface S13 thereof is concave. In addition, inflection points are formed on both surfaces S12 and S13 of the sixth lens 660. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 600 includes a stop ST having a surface S5. For example, the stop ST is disposed between the second lens 620 and the third lens 630. However, the location of the stop ST is not limited to between the second lens 620 and the third lens 630 and the location of the stop ST may be varied as desired. The stop ST disposed as described above adjusts an amount of light incident on an imaging plane 680.

The optical imaging system 600 includes a filter 670 having an object-side surface S14 and an image-side surface S15. For example, the filter 670 is disposed between the sixth lens 660 and the imaging plane 680. However, the location of the filter 670 is not limited to between the sixth lens 660 and the imaging plane 680 and the location of the filter 670 may be varied as desired. The filter 670 disposed as described above filters infrared rays from being incident on the imaging plane 680.

The optical imaging system 600 includes an image sensor. The imaging plane 680 is provided by a surface S16 of the image sensor, on which light refracted through the lenses is incident. In addition, the image sensor converts an optical signal incident on the imaging plane 680 into an electrical signal. In other words, the image sensor converts light incident to the imaging plane 680 into an electrical signal.

The optical imaging system 600 configured as described above has a low F number. For example, an F number of the optical imaging system according to the sixth embodiment is 2.10.

Figure 22:
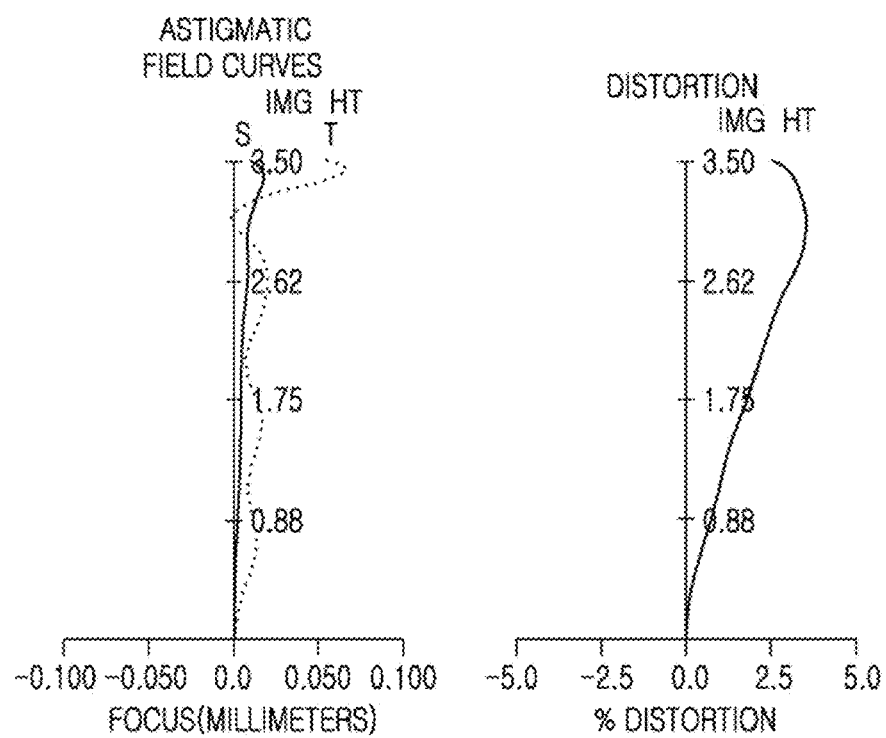
FIG. 22 is graphs illustrating aberration curves of the optical imaging system illustrated in FIG. 21.

The optical imaging system according to the sixth embodiment has aberration characteristics as illustrated in FIG. 22. FIGS. 23 and 24 are tables illustrating characteristics of lenses and aspherical characteristics of the optical imaging system according to the sixth embodiment.

Figure 25:
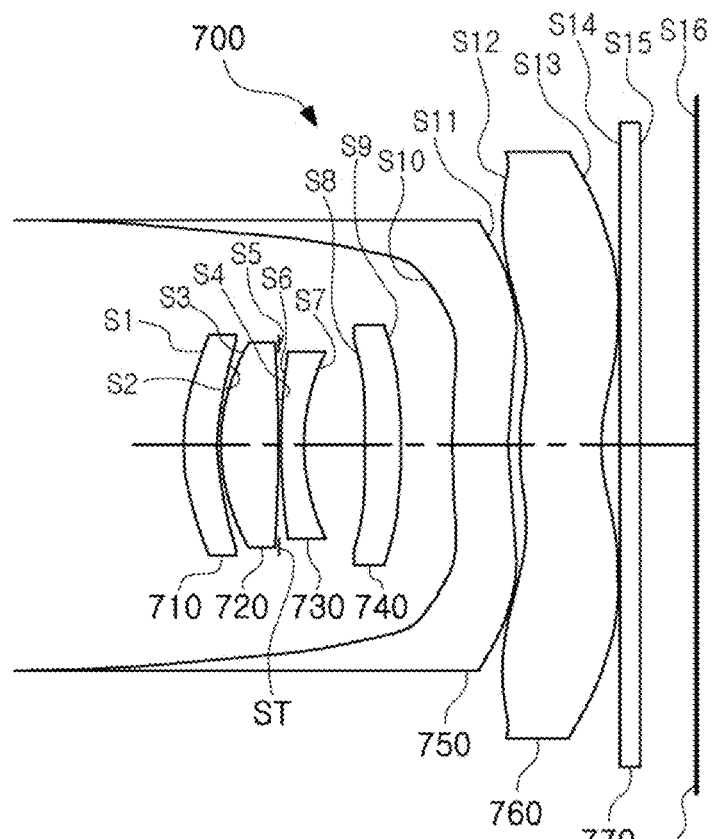
FIG. 25 is a view of an optical imaging system according to a seventh embodiment.

Referring to FIG. 25, an optical imaging system 700 according to a seventh embodiment includes a plurality of lenses each having a refractive power. For example, the optical imaging system 700 includes a first lens 710, a second lens 720, a third lens 730, a fourth lens 740, a fifth lens 750, and a sixth lens 760.

The first lens 710 has a negative refractive power, and an object-side surface S1 thereof is convex and an image-side surface S2 thereof is concave. The second lens 720 has a positive refractive power, and both surfaces S3 and S4 thereof are convex. The third lens 730 has a negative refractive power, and an object-side surface S6 thereof is convex and an image-side surface S7 thereof is concave. The fourth lens 740 has a positive refractive power, and an object-side surface S8 thereof is concave and an image-side surface S9 thereof is convex. The fifth lens 750 has a negative refractive power, and an object-side surface S10 thereof is convex and an image-side surface S11 thereof is concave. In addition, inflection points are formed on both surfaces S10 and S11 of the fifth lens 750. For example, the object-side surface S10 of the fifth lens 750 is convex in a paraxial region thereof, and concave in the vicinity of the paraxial region. Similarly, the image-side surface S11 of the fifth lens 750 is concave in a paraxial region thereof, and convex in the vicinity of the paraxial region. The sixth lens 760 has a positive refractive power, and an object-side surface S12 thereof is convex and an image-side surface S13 thereof is concave. In addition, inflection points are formed on both surfaces S12 and S13 of the sixth lens 760. For example, the object-side surface S12 of the sixth lens is convex in a paraxial region thereof, and concave in the vicinity of the paraxial region. Similarly, the image-side surface S13 of the sixth lens is concave in a paraxial region thereof, and convex in the vicinity of the paraxial region.

The optical imaging system 700 includes a stop ST having a surface S5. For example, the stop ST is disposed between the second lens 720 and the third lens 730. However, the location of the stop ST is not limited to between the second lens 720 and the third lens 730 and the location of the stop ST may be varied as desired. The stop ST disposed as described above adjusts an amount of light incident on an imaging plane 780.

The optical imaging system 700 includes a filter 770 having an object-side surface S14 and an image-side surface S15. For example, the filter 770 is disposed between the sixth lens 760 and the imaging plane 780. However, the location of the filter 770 is not limited to between the sixth lens 760 and the imaging plane 780 and the location of the filter 770 may be varied as desired. The filter 770 disposed as described above filters infrared rays from being incident on the imaging plane 780.

The optical imaging system 700 includes an image sensor. The imaging plane 780 is provided by a surface S16 of the image sensor, on which light refracted through the lenses is incident. In addition, the image sensor converts an optical signal incident on the imaging plane 780 into an electrical signal. In other words, the image sensor converts light incident to the imaging plane 680 into an electrical signal.

The optical imaging system 700 configured as described above has a low F number. For example, an F number of the optical imaging system according to the seventh embodiment is 2.11.

Figure 26:
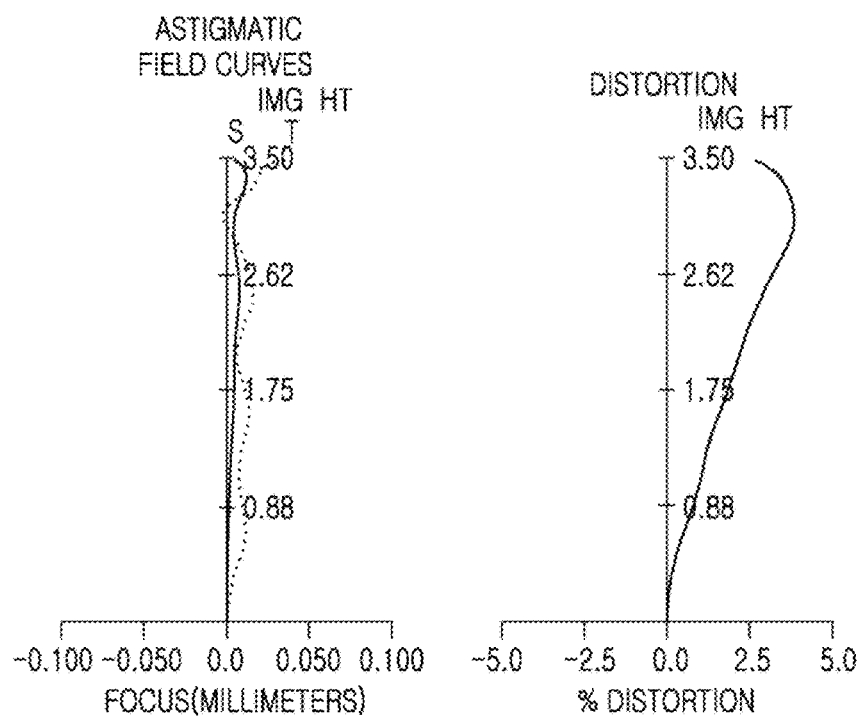
FIG. 26 is graphs illustrating aberration curves of the optical imaging system illustrated in FIG. 25.

The optical imaging system according to the seventh embodiment has aberration characteristics as illustrated in FIG. 26. FIGS. 27 and 28 are tables illustrating characteristics of lenses and aspherical characteristics of the optical imaging system according to the seventh embodiment.

An overall focal length of each of the optical imaging systems according to the first to seventh embodiments has a range of 4.0 to 4.6 mm. A focal length of the first lens of each of the optical imaging systems has a range of −1100 to −120 mm. A focal length of the second lens of each of the optical imaging systems have a range of 2 to 3 mm. A focal length of the third lens of each of the optical imaging systems has a range of −7 to −4 mm. A focal length of the fourth lens of each of the optical imaging systems has a range of 30 to 52 mm. A focal length of the fifth lens of each of the optical imaging systems has a range of −14 to −8 mm. A focal length of the sixth lens of each of the optical imaging systems has a range of 180 to 7000 mm.

An overall field of view of each of the optical imaging systems configured as described above may be 70 degrees or more, and an F number of each of the optical imaging systems may be 2.20 or less.

Table 1 below represents values of Conditional Expressions of the optical imaging systems according to the first to seventh embodiments. As seen in Table 1, the optical imaging systems according to the first to seventh embodiments may satisfy all of the numerical ranges of the Conditional Expressions described above.

TABLE 1

| Conditional Expression | First Embodiment | Second Embodiment | Third Embodiment | Fourth Embodiment | Fifth Embodiment | Sixth Embodiment | Seventh Embodiment |
|---|---|---|---|---|---|---|---|
| f1/f | −137.112 | −148.183 | −229.304 | −54.109 | −55.379 | −41.506 | −29.234 |
| V1-V2 | 0 | 0 | 0 | 0 | 0 | 0 | 0 |
| V1-V3 | 34.60 | 34.60 | 34.60 | 34.60 | 34.60 | 34.60 | 34.60 |
| V1-V5 | 34.60 | 34.60 | 34.60 | 34.60 | 34.60 | 34.60 | 34.60 |
| f2/f | 0.6411 | 0.6412 | 0.6358 | 0.6276 | 0.6295 | 0.6300 | 0.6228 |
| f3/f | −1.3525 | −1.3508 | −1.3200 | −1.3180 | −1.3112 | −1.3184 | −1.3336 |
| |f4/f| | 11.2464 | 11.5681 | 7.4904 | 7.6726 | 8.5387 | 8.1546 | 10.9755 |

TABLE 1-continued

| Conditional Expression | First Embodiment | Second Embodiment | Third Embodiment | Fourth Embodiment | Fifth Embodiment | Sixth Embodiment | Seventh Embodiment |
|---|---|---|---|---|---|---|---|
| f5/f  | −2.7565  | −2.7353  | −2.2549  | −2.2356 | −2.4130 | −2.4689 | −2.5216 |
| TTL/f | 1.1847   | 1.1845   | 1.1734   | 1.1705  | 1.1733  | 1.1782  | 1.1741  |
| f1/f2 | −213.869 | −231.117 | −360.655 | −86.221 | −87.973 | −65.879 | −46.938 |
| f2/f3 | −0.4740  | −0.4746  | −0.4817  | −0.4761 | −0.4801 | −0.4779 | −0.4670 |
| BFL/f | 0.2213   | 0.2209   | 0.2160   | 0.2171  | 0.2180  | 0.2191  | 0.2185  |
| D12/f | 0.0107   | 0.0106   | 0.0097   | 0.0086  | 0.0084  | 0.0077  | 0.0073  |
| R7/f  | 0.5393   | 0.5387   | 0.5292   | 0.5287  | 0.5274  | 0.5303  | 0.5334  |
| R11/f | 0.8854   | 0.8775   | 0.7908   | 0.7861  | 0.7790  | 0.7775  | 0.7522  |

As set forth above, according to one or more embodiments, an optical imaging system having a high level of resolution and a high level of brightness may be achieved.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having negative refractive power and a concave image-side surface;
   a second lens having positive refractive power;
   a third lens having negative refractive power and a convex object-side surface;
   a fourth lens having positive refractive power and a concave object-side surface in a paraxial region;
   a fifth lens having negative refractive power; and
   a sixth lens having positive refractive power,
   wherein the optical imaging system includes a total of six lenses with refractive power and the first to sixth lenses are sequentially disposed in ascending numerical order from an object side of the optical imaging system toward an imaging plane of the optical imaging system, and
   wherein the fifth lens has a focal length within a range of −14 mm to −8 mm.

2. The optical imaging system of claim 1, wherein the second lens has a convex object-side surface.

3. The optical imaging system of claim 1, wherein the fifth lens has a convex object-side surface.

4. The optical imaging system of claim 1, wherein the sixth lens has a convex object-side surface.

5. The optical imaging system of claim 1, wherein the sixth lens has a concave image-side surface.

6. The optical imaging system of claim 1, wherein the sixth lens has an inflection point formed on an image-side surface thereof.

7. An optical imaging system comprising:
   a first lens having negative refractive power and a concave image-side surface;
   a second lens having positive refractive power;
   a third lens having negative refractive power and a convex object-side surface;
   a fourth lens having positive refractive power and a concave object-side surface in a paraxial region;
   a fifth lens having negative refractive power and a convex object-side surface; and
   a sixth lens having positive refractive power,
   wherein the optical imaging system includes a total of six lenses with refractive power and the first to sixth lenses are sequentially disposed in ascending numerical order from an object side of the optical imaging system toward an imaging plane of the optical imaging system, and
   wherein the fifth lens has a focal length within a range of −14 mm to −8 mm.

8. The optical imaging system of claim 7, wherein the first lens has a convex object-side surface.

9. The optical imaging system of claim 7, wherein the second lens has a convex object-side surface.

10. The optical imaging system of claim 7, wherein the third lens has a concave image-side surface.

11. The optical imaging system of claim 7, wherein the fifth lens has a concave image-side surface in a paraxial region.

12. The optical imaging system of claim 7, wherein the sixth lens has a convex object-side surface.

13. The optical imaging system of claim 7, wherein the sixth lens has a concave image-side surface.

14. The optical imaging system of claim 7, wherein the sixth lens has an inflection point formed on an image-side surface thereof.

\* \* \* \* \*